Patented Oct. 13, 1953

2,655,490

UNITED STATES PATENT OFFICE 2,655,490

CATALYTIC HARDENING OF PHENOL-FORM-ALDEHYDE RESINS AND COMPOSITIONS COMPRISING SAME

Lawrence F. Sonnabend and Alvin M. Edmunds, Midland, Mich., assignors to The Dow Chemical Company, Midland, Mich., a corporation of Delaware No Drawing. Application June 3, 1950, Serial No. 166,066

8 Claims. (Cl. 260—38)

This invention concerns new phenol-formaldehyde resin compositions which comprise certain catalysts causing hardening of the same at ordinary temperatures or above to form substantially non-porous solid bodies. It pertains especially to acid-resistant cements comprising a phenolformaldehyde resin, one or more of the catalysts required by the invention, and a solid acid-resistant filler, e. g. graphite, carbon, sand, or other acid-resistant metal oxides or metal silicates, etc. The invention pertains more particularly to such acid-resistant cements comprising graphite or carbon as the principal ingredient of the filler and comprising a mixture of benzene sulphonyl chloride and a polychloroacetic acid as the catalyst. The last mentioned cements possess excellent stability, after being hardened, against further change in volume on standing, e. g. a 10-inch test bar of such freshly hardened cement changes in length by less than 0.004 inch, or less than 0.04 per cent of its original length, on standing for 30 days at room temperature.

All of the compositions provided by the invention may be applied in forming acid-resistant layers, walls, or coatings which are substantially impermeable to water and other liquids. The compositions comprising the phenol-formaldehyde resins and the required catalysts, but little or no filler, may be diluted, when necessary, with water-miscible organic solvents such as monohydric and polyhydric alcohols, ketones and mixtures of such water-miscible solvents with one another and/or with an equal weight or less of aromatic solvents such as benzene, toluene, xylene, or solvent naphtha, etc., and be applied as a varnish to solid base members such as wood, paper, concrete, ceramics, etc., to form a protective coating which hardens quite rapidly at ordinary or elevated temperatures, e. g. at 0° C. or above. The cements may be applied directly in lining the inside of acid-storage tanks, or may be employed as mortar for tile or brick. The aforementioned cements of good dimensional stability are particularly adapted to such uses, since they do not tend to develop cracks or other flaws on standing.

It is well known that phenol-formaldehyde resins may be hardened by treatment with acids, or organic sulphonyl chlorides. It is also known to prepare acid-resistant cements by admixing such resins, in liquid state, with fillers and catalysts. For instance, U. S. Patent No. 2,034,802 teaches that self-hardening cements may be made by admixing fillers with a liquid phenol-formaldehyde resin and adding a salt of an alkyl sulphuric acid or an aromatic sulphonyl chloride, but toluene sulphonyl chlorides are the only sulphonyl chloride catalysts specifically mentioned. Use of other acids such as hydrochloric acid, sulphuric acid, or sulphonic acids, etc., as catalysts for the hardening of phenol-formaldehyde resins is conventional.

We have observed that although acids and organic sulphonyl chlorides in general are effective as catalysts in causing rapid hardening of phenol-formaldehyde resins, most such catalysts, particularly when used in setting up cements of the phenol-formaldehyde type, tend to cause formation of a porous hardened product having little value as, or in, the lining of acid containers. The reason for development of the porosity is not definitely known, but is assumed to be due to excessive shrinkage of the resin, or in some instances to internal generation of a gas, during hardening, or both. We have observed that many of the usual catalysts can be used to harden the cements without development of porosity, provided that suitable conditions of catalyst concentration, hardening temperature, etc., are employed. However, with most catalysts, such conditions (particularly as to the proportion and concentration of the catalyst) required to avoid development of porosity are highly critical and the discovery and employment of the necessary conditions is difficult and inconvenient.

We have also observed that the phenol-formaldehyde resin compositions often undergo a further and gradual change in volume after being hardened and that the extent and order of such volume change, i. e. whether it involves shrinkage or swelling, varies greatly with changes in the kind of catalyst used for hardening of the resins and in the kind of filler, if any, present in the resin composition.

We have found that benzene sulphonyl chloride, dichloroacetic acid and trichloroacetic acid are effective catalysts for the hardening of phenol-formaldehyde resins and that they may be used in widely varying proportions to obtain substantially non-porous hardened products. It may be mentioned that benzene sulphonyl chloride is far different in action from the para-toluene sulphonyl chloride heretofore used to catalyze hardening of phenol-formaldehyde type cements, in that a cement hardened with benzene sulphonyl chloride has greater dimensional stability and greater resistance to the corrosive action of aqueous hydrochloric acid than has a cement hardened with paratoluene sulphonyl chloride, but of otherwise similar composition.

We have further found that phenol-formaldehyde cements containing graphite or carbon as the filler undergo a gradual and slight expansion after being hardened with benzene sulphonyl chloride, but undergo a gradual contraction or shrinkage after being hardened with a polychloroacetic acid, and that by using a mixture of benzene sulphonyl chloride and one or both of the polychloroacetic acids as the catalyst, hardening may be accomplished to obtain a hardened cement of excellent dimensional stability. However, to obtain such high dimensional stability it is important that 50 per cent by weight or more of the filler consist of graphite or carbon. In most instances, cements comprising a phenol-formaldehyde resin and sand alone as a filler changed appreciably in volume after hardening, regardless of the kind of hardening catalyst used. However, the volume change (usually shrinkage) was not sufficient to cause development of cracks, or other serious flaws, when using the cement as a mortar, e. g. for bonding bricks or tile. In instance where an extended cement slab, e. g. of at least one foot width and 5 feet length or greater, is to be formed, it is preferable that the cement be one which, after hardening, possesses good dimensional stability, since otherwise cracks may develop in the hardened cement slab or wall.

Any thermosetting phenol-formaldehyde resin, in a water-insoluble liquid state, may be employed in the compositions of the invention. In general, such resins are prepared by condensation of one molecular equivalent of a monohydric phenol, which is unsubstituted in at least one of the 2-, 4- and 6- positions of the benzene nucleus, with between 1 and 2.5, preferably between 1.40 and 1.50, molecular equivalents of formaldehyde and discontinuing the condensation reaction when the product becomes water-insoluble, but remains liquid. Procedures for making such liquid phenol-formaldehyde condensation products are well known and need not be given in detail. However, we usually start the condensation reaction under alkaline conditions, e. g. using from 1 to 2 per cent by weight of sodium hydroxide, potassium hydroxide, sodium carbonate, or other alkali as catalyst and carry it out at temperatures in the order of from 40° to 70° C. to a point at which the product is a fairly thin, water-soluble liquid. We then acidify the mixture by adding a strong aqueous mineral acid such as hydrochloric or sulphuric acid, etc., and continue the reaction at similar temperatures until the mixture becomes fairly viscous and is water-insoluble. The reaction is preferably stopped short of the solidification point, since the liquid resin is more conveniently used in preparing the compositions of the invention than is the solid thermoplastic state of the resin, but either such state of the resin can be used. It is essential that the phenol-formaldehyde condensation reaction be carried to a point at which the product is substantially water-insoluble (although said product itself may have from 20 to 35 per cent of water dissolved in it), since the water-soluble liquid condensation products formed in the earlier stages of the phenolformaldehyde condensation reaction usually harden to form porous products when used directly as the resin component of the compositions of the invention.

After carrying the phenol-formaldehyde condensation reaction out in the presence of an acid to a point at which the product is a water-insoluble liquid, the mixture is neutralized, e. g. with aqueous ammonia, NaOH, KOH, Na₂CO₃ or K₂CO₃, etc., and washed thoroughly with water. It usually then retains from 20 to 35 per cent by weight of dissolved water, but is suitable for direct use in the compositions of the invention. In most instances, such condensation product of phenol and formaldehyde has a viscosity of from 300 to 400 centipoises at 25° C., but it may be of lower or higher viscosity. If desired, it may be heated, preferably under vacuum, to remove part or all of the water prior to use in the compositions of the invention.

The liquid, water-insoluble phenol-formaldehyde resin may be treated directly with from 1 to 35 per cent by weight of at least one of the catalysts, dichloroacetic acid, trichloroacetic acid and benzene sulphonyl chloride, based on the anhydrous weight of the resin, to obtain a coating composition which may be applied as a film to solid base members such as wood, steel, etc., and which hardens quite rapidly at ordinary or elevated temperatures, e. g. at temperatures between 10° and 60° C. or above, to form a water-impermeable protective coating on the base member. Usually, the resin is diluted with a water-miscible solvent such as ethyl alcohol, butyl alcohol, ethylene glycol, propylene glycol, acetone, or a mixture of such solvents, so as to bring it to a viscosity best suited for application, e. g. by brushing, dipping, or spraying, prior to addition of the catalyst when it is to be used for such coating purposes. If desired, paints, or enamels, may be prepared by admixing pigments with the varnish compositions just described.

Acid proof cements are prepared by admixing the aforementioned liquid, water-insoluble phenol-formaldehyde condensation product with a minor amount, e. g. from 1 to 35 per cent of its dry weight of one or more of the above-mentioned catalysts and adding and stirring into the mixture sufficient of an acid-resistant, powdered or granular filler such as carbon, graphite, sand, or glass, etc., to form a thick paste suitable for troweling. Such cement usually contains from 30 to 70 per cent by weight of filler, but this proportion varies with change in the kind of filler used. The cement hardens on standing to form a water-impermeable solid mass having good resistance to the corrosive action of non-oxidizing acids such as hydrochloric acid, hydrobromic acid, aqueous sulphuric acid, or phosphoric acid, etc. Such cements are well adapted for use as mortar for the bonding of tile, or brick, used in lining vessels to be filled with acid and may in some instances be applied alone or with reinforcing as the lining for such vessels. However, most of such cements undergo gradual shrinkage after being hardened and are not well-adapted for application over extensive surfaces where such shrinkage may result in development of cracks.

Cements having exceptionally good dimensional stability, and adapted for application over extensive areas, may be prepared as just described, by employing a filler comprising at least 50 per cent by weight of carbon or graphite in finely divided form and using a mixture of benzene sulphonyl chloride and a polychloroacetic acid, preferably trichloroacetic acid, as the hardening catalyst. Use of such catalyst mixtures containing from 33 to 98 per cent by weight of benzene sulphonyl chloride causes formation of a hardened cement having greater dimensional stability than is obtained by use of either benzene sulphonyl chloride alone, or a polychloroacetic acid alone, as the cement-hardening catalyst. Such catalyst mixtures containing from 60 to 90 per cent of benzene sulphonyl chloride cause hardening to form hardened cements having good strength characteristics and exceptional dimensional stability and are preferred. As hereinbefore mentioned, the cement may contain the catalyst mixture in amount corresponding to from 1 to 35 per cent of the anhydrous weight of the liquid phenol-formaldehyde condensation product. Hardening usually occurs in from 30 minutes to 5 hours after addition of the catalyst, but the time varies with change in the temperature or the proportion of catalyst used. The time for hardening may be shortened by warming the cement.

The following examples describe a number of ways in which the principle of the invention has been applied and illustrate certain of its advantages, but are not to be construed as limiting the invention.

EXAMPLE 1

A mixture of 44.5 parts by weight of phenol, 55.5 parts of an aqueous formaldehyde solution of 37 weight per cent concentration, and 1.5 parts of sodium hydroxide was reacted at 60° C. for 6 hours. At this stage of the reaction, the liquid condensation product was water-soluble. The mixture was then acidified by addition of 33 cc. of aqueous sulphuric acid of 30 per cent concentration per pound of the mixture to which the acid was added. The acidified mixture was agitated, while warmed to about 40° C., for from 2 to 3 hours. The aqueous and organic layers of the mixture were separated and the organic layer was washed thoroughly with water. The water-insoluble liquid phenolformaldehyde product thus obtained, retained from 20 to 35 per cent of water dissolved therein. It was treated with approximately 3 per cent of its weight of benzene sulphonyl chloride and permitted to stand at room temperature, i. e. at 25° C. or thereabout. In 6 hours it had hardened to a solid, non-porous and water-impermeable resin body.

EXAMPLE 2

To 100 parts by weight of a liquid, water-insoluble phenol-formaldehyde resin, prepared as in Example 1, there was added, with stirring, 3 parts of trichloroacetic acid. The mixture solidified and hardened to a non-porous, water-impermeable mass on standing for 10 hours at room temperature. In place of trichloroacetic acid, dichloroacetic acid or a mixture of these two acids can be used to cause hardening of the liquid resin to a solid, non-porous body. However, trichloroacetic acid is more satisfactory than dichloroacetic acid for the purpose, and monochloroacetic acid is poorly suited, since it often fails to cause adequate hardening of the resin at room temperature. Apparently, each chlorine atom of the chlorinated acetic acids modifies and increases somewhat the activity of the chlorinated acids as catalysts for the hardening of phenol-formaldehyde resins.

EXAMPLE 3

This example illustrates use of the individual catalysts, benzene sulphonyl chloride and trichloroacetic acid, as catalysts for the hardening of phenol-formaldehyde cements. It shows that either such catalyst may be used in varying proportions to produce non-porous hardened cements and that the kind and proportion of filler in the cements may also be varied. The liquid, water-insoluble phenol-formaldehyde condensation product used as the resin ingredient of each cement was prepared by reacting one molecular equivalent of phenol with 1.45 mols of formaldehyde initially in the presence of a minor amount of sodium hydroxide and thereafter in the presence of sulphuric acid, neutralizing the liquid product, and washing it with water to remove salts. The product retains from 18 to 35 per cent by weight of water; its water-content, when determined, being indicated in the following table. This liquid resin was treated with the kind and proportion of catalyst indicated in the table and the resultant solution was admixed with the kind and proportion of filler also indicated. The proportions of these ingredients are expressed as per cent of the weight of the mixture. The table also gives the ratio by weight of catalyst to resin in the mixture. Each of the cements, thus prepared, hardened at room temperature in from ½ to 5 hours to a non-porous, water-impermeable, solid body. In the table, benzene sulphonyl chloride and trichloroacetic acid are abbreviated as "$PhSO_2Cl$" and "$Cl_3Ac$," respectively.

Table 1

| Run No. | Percent of $H_2O$ in resin | Resin, percent | Catalyst | | Filler | | Wt. ratio of catalyst/resin |
|---|---|---|---|---|---|---|---|
| | | | Kind | Percent | Kind | Percent | |
| 1 | 23.3 | 57.90 | $PhSO_2Cl$ | 7.08 | Graphite | 35 | 0.122 |
| 2 | 30.0 | 44.55 | do | 5.45 | do | 50 | .122 |
| 3 | 23.3 | 62.37 | do | 7.63 | $SiO_2$ powder | 30 | .122 |
| 4 | Not det'd | 42.77 | do | 5.23 | do | 52 | .122 |
| 5 | do | 48.03 | do | 5.87 | Carbon powder | 46.1 | .122 |
| 6 | 18.3 | 55.25 | $Cl_3Ac$ | 9.75 | Graphite | 35 | .177 |
| 7 | 30.0 | 42.50 | do | 7.50 | do | 50 | .177 |
| 8 | 30–32 | 36.90 | do | 8.10 | do | 55 | .177 |
| 9 | Not det'd | 29.75 | do | 5.25 | $SiO_2$ powder | 65 | .22 |
| 10 | do | 41.73 | do | 7.37 | do | 50.9 | .177 |
| 11 | 23.3 | 46.75 | do | 13.20 | do | 40 | .177 |
| 12 | Not det'd | 25.50 | do | 4.50 | Sand | 70 | .28 .176 |

EXAMPLE 4

Three cements were prepared using 50 parts by weight of powdered graphite, 30 parts of the liquid, water-insoluble phenol-formaldehyde condensation product of 30 per cent water content, and the catalyst named in Table II in the parts by weight given. The procedure in preparing each cement was similar to that described in Example 3. Each freshly prepared cement was shaped into bars and briquettes suitable for use in determining properties of the cement after hardening. The bars were of 1 inch square cross section and of approximately 10 inches length. Each briquette was 1 inch thick and of 1 inch square cross section at the mid-point of its length. The end-portions were widened in a tapered manner to permit gripping. The bars and briquettes set to a solid, rigid, non-porous condition at room temperature. When hardened, the length of a bar of each cement was measured. These bars were permitted to stand for 30 days and their lengths again measured. The table gives the per cent change in length of each bar, a minus sign ahead of the value being used to indicate shrinkage and a plus sign to indicate expansion. The tensile strength, in pounds per square inch cross section, of a briquette of each cement was measured 30 days after hardening and is given in the table. A hardened briquette of each cement was weighed and then immersed in a bath of aqueous hydrochloric acid of 20 per cent concentration for 30 days, the bath being heated at a temperature of 60° C. throughout this period. The briquette was then removed, washed quickly in running water, surface dried, and reweighed. The per cent loss in weight due to immersion in the acid is given in the table as a measure of the resistance of the cement to acid-corrosion. After such immersion in acid, the tensile strength of each briquette was again determined, and is given in the table. In the table, the names benzene sulphonyl chloride and trichloroacetic acid are abbreviated, as in Example 3. Para-toluene sulphonyl chloride is abbreviated as "Tol-SO$_2$Cl."

Table II

| Run No. | Catalyst | | Percent length change | Tensile strength, lbs./sq.in. | Results of acid test | |
|---|---|---|---|---|---|---|
| | Kind | Pts. | | | Percent wt. loss | Tensile strength after test, lbs./sq.in. |
| 1 | Tol-SO$_2$Cl | 5.45 | −0.141 | 1,405 | 2.37 | 1,169 |
| 2 | PhSO$_2$Cl | 5.45 | +0.052 | 1,347 | 1.61 | 1,265 |
| 3 | Cl$_3$Ac | 7.5 | −0.059 | 1,162 | 2.53 | 1,230 |

EXAMPLE 5

A number of cements were prepared by procedure similar to that described in Example 3, except that graphite or carbon was used as the filler in each of these cements and a mixture of benzene sulphonyl chloride and one or more of the polychloroacetic acids was used as the catalyst for hardening each cement. The liquid, water-insoluble phenol-formaldehyde condensation product used as an ingredient of each cement composition contained about 30 per cent by weight of water. Each cement composition was shaped into test bars and briquettes similar to those described in Example 4. The bars and briquettes hardened at room temperature to a solid rigid condition. In most instances, hardening occurred in from ½ to 5 hours after forming the mixtures. All of the hardened briquettes were nonporous and impervious to water. The properties of the hardened bars and briquettes were determined as in Example 4. Table III names, and gives the parts by weight of, the respective ingredients used in preparing each cement and the properties which were determined for the hardened cement test bars. In the table benzene sulphonyl chloride and trichloroacetic acid are abbreviated, as in the preceding examples. Dichloroacetic acid is abbreviated as "Cl$_2$Ac."

Table III

| Run No. | Cement Composition | | | | | Percent of PhSO$_2$Cl in catalyst | Percent length change | Tensile strength lbs./sq.in. | Results of acid test | |
|---|---|---|---|---|---|---|---|---|---|---|
| | Resin, pts. | PhSO$_2$Cl pts. | Polychloroacetic acid | | Filler | | | | Percent wt. Loss | Tensile strength after test lbs./sq.in. |
| | | | Kind | Pts. | Kind | Percent | | | | |
| 1 | 42.5 | None | Cl$_3$Ac | 7.5 | Graphite | 50 | 0 | −0.042 | 795 | 1.90 | 1,000 |
| 2 | 47.2 | 1.2 | do | 6.6 | do | 45 | 15.4 | −.038 | 1,042 | 2.32 | 1,114 |
| 3 | 47.5 | 2.1 | do | 5.36 | do | 45 | 28.2 | −.048 | (¹) | 2.61 | 915 |
| 4 | 47.9 | 3 | do | 4.13 | do | 45 | 42.1 | −.022 | 1,038 | 1.79 | 1,395 |
| 5 | 48.3 | 2.89 | do | 3.90 | do | 45 | 42.6 | −.034 | 1,097 | 1.68 | 1,463 |
| 6 | 44.5 | 4.37 | do | 1.50 | do | 50 | 74.5 | −.010 | 1,136 | 1.55 | 1,307 |
| 7 | 44.5 | 5.45 | do | None | do | 50 | 100.0 | +.025 | 1,347 | 1.61 | 1,265 |
| 8 | 43.5 | 2.73 | do | 3.75 | Carbon powder | 50 | 42.1 | −.023 | 1,152 | (¹) | 1,874 |
| 9 | 39.2 | 2.44 | do | 3.36 | do | 55 | 42.1 | −.015 | 1,192 | 1.02 | 1,720 |
| 10 | 45.6 | 2.86 | {Cl$_2$Ac, Cl$_3$Ac} | {.39, 3.54} | Graphite | | 47.6 | −.024 | 1,193 | 1.81 | |

¹ Not determined.

Other modes of applying the principle of the invention may be employed instead of those explained, change being made as regards the method or compositions herein disclosed, provided the steps or ingredients stated in any of the following claims or the equivalent of such stated steps or ingredients be employed.

We therefore particularly point out and distinctly claim as our invention:

1. A method, as described in claim 7, wherein the filler is of the group consisting of carbon and graphite and the hardening agent is a mixture of trichloroacetic acid and benzene sulphonyl chloride containing between 60 and 90 per cent of the latter.

2. A composition, as described in claim 8, wherein the hardening agent is in amount corresponding to from 1 to 35 per cent of the anhydrous weight of the liquid phenol-formaldehyde condensation product.

3. A cement capable of hardening on standing to a non-porous solid body, which cement comprises a liquid, water-insoluble phenol-formaldehyde condensation product, a hardening agent consisting essentially of from 10 to 40 per cent by weight of trichloroacetic acid and from 60 to 90 per cent of benzene sulfonyl chloride, which hardening agent is in amount corresponding to from 1 to 35 per cent of the anhydrous weight of the liquid, water-insoluble phenol-formaldehyde condensation product, and a finely divided, acid-resistant solid filler in amount sufficient to permit troweling of the composition.

4. A method which comprises admixing, with a liquid water-insoluble condensation product of formaldehyde and phenol, a minor amount of a hardening agent consisting essentially of a mixture of trichloroacetic acid and benzene sulfonyl chloride containing from 33 to 98 per cent by weight of the latter, shaping the resultant composition, and causing the shaped composition to stand at about room temperature, whereupon it hardens to a solid, non-porous body.

5. A method, as claimed in claim 4, wherein the hardening agent is admixed with the liquid, water-insoluble phenol-formaldehyde condensation product in amount corresponding to from 1 to 35 per cent of the anhydrous weight of said condensation product.

6. A method, as described in claim 4, wherein the liquid, water-insoluble phenol-formaldehyde condensation product is one prepared by reacting phenol with from 1 to 2.5 moles of formaldehyde initially in the presence of an alkaline condensation catalyst and subsequently in the presence of an acidic catalyst.

7. A method which comprises admixing with a liquid, water-insoluble condensation product of formaldehyde and phenol, a minor amount of a hardening agent, consisting essentially of a mixture of trichloroacetic acid and benzene sulfonyl chloride containing from 33 to 98 per cent of the latter, and sufficient of a finely divided, acid-resistant solid filler to form a paste-like cement capable of being troweled, shaping the cement, and permitting it to stand at about room temperature, whereupon it hardens to a non-porous solid body.

8. A composition comprising a liquid, water-insoluble condensation product of phenol and formaldehyde, which condensation product is in amount sufficient, when hardened, to set the entire composition to a rigid, solid mass, and a minor amount of a hardening agent consisting essentially of a mixture of trichloroacetic acid and benzene sulfonyl chloride containing from 33 to 98 per cent by weight of the latter.

LAWRENCE F. SONNABEND.
ALVIN M. EDMUNDS.

References Cited in the file of this patent

UNITED STATES PATENTS

| Number | Name | Date |
|---|---|---|
| 2,034,802 | Frank | Mar. 24, 1936 |
| 2,390,198 | Voss | Dec. 4, 1945 |

FOREIGN PATENTS

| Number | Country | Date |
|---|---|---|
| 449,276 | Germany | Sept. 9, 1927 |
| 511,511 | Great Britain | Aug. 21, 1939 |